US011896149B2

(12) United States Patent
Morgan

(10) Patent No.: US 11,896,149 B2
(45) **Date of Patent: *Feb. 13, 2024**

(54) DELIVERY DOOR EXTENSION

(71) Applicant: Dream More Technologies LLC, Chicago, IL (US)

(72) Inventor: Declan Morgan, Chicago, IL (US)

(73) Assignee: Dream More Technologies LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,095

(22) Filed: Aug. 29, 2022

(65) Prior Publication Data

US 2022/0408955 A1 Dec. 29, 2022

Related U.S. Application Data

(63) Continuation of application No. 17/185,530, filed on Feb. 25, 2021, now Pat. No. 11,426,020.

(60) Provisional application No. 62/981,091, filed on Feb. 25, 2020.

(51) Int. Cl.

| | |
|---|---|
| ***A47G 29/124*** | (2006.01) |
| ***E06B 7/32*** | (2006.01) |
| ***E06B 9/04*** | (2006.01) |
| ***A47G 29/20*** | (2006.01) |
| ***A47G 29/14*** | (2006.01) |

(52) U.S. Cl.

CPC ....... *A47G 29/1245* (2013.01); *A47G 29/141* (2013.01); *A47G 29/20* (2013.01); *E06B 7/32* (2013.01); *E06B 9/04* (2013.01); *A47G 2029/1257* (2017.08)

(58) Field of Classification Search

CPC .. A47G 29/1245; A47G 29/141; A47G 29/22; A47G 29/20; A47G 29/28; A47G 2029/1257; A47G 2029/145; E06B 7/28; E06B 7/32; E06B 5/11; E06B 9/04; E06B 2003/7057; E05G 7/00

USPC ................. 232/19, 45, 29, 42, 43.5; 109/66; 160/97; 49/70, 56

See application file for complete search history.

(56) References Cited

U.S. PATENT DOCUMENTS

| | | | | |
|---|---|---|---|---|
| 1,324,608 A * | 12/1919 | Matchette | ............. | A47G 29/20 123/44 E |
| 4,103,458 A * | 8/1978 | Booker | ..................... | E06B 5/11 49/56 |
| 6,164,013 A * | 12/2000 | Ramsey | .................... | E06B 7/32 49/70 |
| 7,165,595 B2 * | 1/2007 | Yamamoto | ................ | E06B 5/11 49/70 |

(Continued)

*Primary Examiner* — William L Miller

(74) *Attorney, Agent, or Firm* — K&L Gates LLP

(57) ABSTRACT

A delivery door extension that attaches to an existing door jamb and engages with an existing door is provided. The delivery door extension includes a panel having a planar body with opposing front and rear surfaces extending between first and second side surfaces, a top surface, and a bottom surface, wherein the panel body includes an opening. The delivery door extension also includes a delivery window body configured to move between an open position and a closed position, a hinge mechanism attached to the first side surface of the panel, a blocking mechanism on the second side surface that restricts movement of the existing door, and a frame that includes first and second portions.

9 Claims, 6 Drawing Sheets

(56) References Cited

U.S. PATENT DOCUMENTS

| | | | | |
|---|---|---|---|---|
| 7,246,562 | B2 * | 7/2007 | Lee | E06B 7/32 109/19 |
| 10,413,106 | B1 * | 9/2019 | Valeriano | A47G 29/141 |
| 10,435,942 | B1 * | 10/2019 | Dunavin | E06B 7/32 |
| 10,512,351 | B1 * | 12/2019 | Valeriano | E05B 47/0001 |
| 10,588,440 | B1 * | 3/2020 | Kajgana | E06B 3/5892 |
| 10,878,647 | B2 * | 12/2020 | Kane | G07C 9/00912 |
| 10,881,233 | B1 * | 1/2021 | Walsh | E06B 7/32 |
| 10,961,770 | B1 * | 3/2021 | Fernandez | E06B 9/02 |
| 11,098,522 | B1 * | 8/2021 | Fugate | E06B 5/10 |
| 11,274,491 | B1 * | 3/2022 | Fernandez | E06B 3/54 |
| 11,534,015 | B2 * | 12/2022 | Janas | A47G 29/22 |
| 2003/0006275 | A1 * | 1/2003 | Gray | A47G 29/14 232/19 |
| 2011/0023365 | A1 * | 2/2011 | Kilfoyle | E06B 7/32 49/70 |
| 2014/0190081 | A1 * | 7/2014 | Wanjohi | A47G 29/126 49/504 |
| 2016/0247344 | A1 * | 8/2016 | Eichenblatt | G07C 9/00896 |
| 2018/0228310 | A1 * | 8/2018 | Enobakhare | A47G 29/20 |
| 2019/0180544 | A1 * | 6/2019 | Newcomb | E06B 7/32 |
| 2019/0316411 | A1 * | 10/2019 | Vanek | E06B 7/32 |
| 2020/0071991 | A1 * | 3/2020 | Patel | E06B 7/34 |
| 2020/0170434 | A1 * | 6/2020 | Lemieux | A47G 29/20 |
| 2020/0308903 | A1 * | 10/2020 | Anderson | E05F 15/76 |
| 2020/0385119 | A1 * | 12/2020 | Hanke | E06B 3/2605 |
| 2021/0038004 | A1 * | 2/2021 | Graña Domínguez | E06B 7/32 |
| 2021/0059456 | A1 * | 3/2021 | Fontanilla | A47G 29/16 |
| 2021/0079720 | A1 * | 3/2021 | Hunt | E06B 7/28 |
| 2021/0177182 | A1 * | 6/2021 | Plummer | A47G 29/28 |
| 2021/0207431 | A1 * | 7/2021 | Kim | A47G 29/141 |
| 2021/0209878 | A1 * | 7/2021 | Kim | G07C 9/00563 |
| 2021/0230926 | A1 * | 7/2021 | Schler | A47G 29/141 |

* cited by examiner

DELIVERY DOOR EXTENSION

CROSS-REFERENCE TO RELATED APPLICATIONS

This application comprises a continuation application of U.S. application Ser. No. 17/185,530 filed Feb. 25, 2021, which claims the benefit of priority to U.S. Provisional Application No. 62/981,091 filed on Feb. 25, 2020, the disclosures of which are incorporated herein by reference.

BACKGROUND OF THE INVENTION

The present subject matter relates generally to a door attachment that allows packages to be delivered securely inside the recipient's home or business without providing access to the person delivering the package. More specifically, the present application is directed to a delivery door extension that extends between a door jamb and an existing door in an opened position to provide a secure window that allows for safe delivery of packages.

Over the last several years, online sales have become a mainstay for businesses and their customers, representing a major shift in the buying habits of consumers. The ease and convenience of shipping consumer goods directly to the customer has altered the landscape of the marketplace, with many consumers making the bulk of their purchases through online outlets. Consumers have grown accustomed to arriving home at the end of the day to a stack of boxes on their front porch, which is very attractive to the thieves who often drive through neighborhoods in the afternoon, stealing these unsecured boxes.

Additionally, advances in drone technology are enabling delivery companies to utilize unmanned drones to move packages from distribution centers and warehouses directly to their customers. As this technology continues to develop, many online retailers will look to drones as an inexpensive and environmentally conscious delivery method.

An important concern is that in addition to purchasing consumer goods and sundry household items from online outlets, many consumers also have necessary medications, medical supplies, and medical devices shipped directly to their door. For these sensitive items, as well as items of high value, a signature confirmation of receipt is often required by the seller to help protect against theft. For customers who work during the day, this creates an inconvenience, because they need to be home to receive the package. When the recipient is not home to receive the package, the shipping companies must retain the item and attempt re-delivery, which increases costs to the delivery service, which in turn increases the costs to the businesses and customers.

Another important concern for consumers who live in shared housing, such as apartment buildings, where packages are often left in the entryway or mail room, is that their neighbors have unfettered access to their packages. This can cause issues with privacy and theft, since any witness might assume that the boxes being stolen belong to the thief.

Additionally, for various reasons including privacy concerns and company policy, many consumers are unable or unwilling to have sensitive or high-value items delivered to their place of employment, where they could confirm delivery.

Further, a concern for many homeowners and business owners is that they typically do not know who delivered their packages to their home or business outside of business hours.

An important concern for shipping companies is the costs involved with missed deliveries that require re-delivery, which consumes additional fuel as well as time and labor. These costs ultimately factor into the costs for consumers and the profitability of manufacturers, wholesalers, and distributors of goods.

Accordingly, a need exists for a delivery door extension that allows delivery drivers to place packages securely inside the recipient's home or business without granting access to the interior, while maintaining the integrity and function of pre-existing electronic security systems, providing visual confirmation for the consumer, digital confirmation of delivery for the seller, and proof of delivery and greatly reduced instances of re-delivery by shipping companies. Furthermore, a need exists for a delivery door extension that collects and transmits data related package shipment, delivery, and receipt, to help companies analyze purchasing habits and preferences of consumers.

BRIEF SUMMARY OF THE INVENTION

To meet the needs described above, the delivery door extension provided herein attaches to an existing door jamb and existing door in order to allow a delivery person to open the door along the width of the delivery door extension while restricting any access into the room, deliver a package by placing the package through a delivery window within the delivery door extension, and then close the door.

The delivery door extension includes a panel mounted into a frame that is roughly equal in height to the adjacent door. The panel has a planar body with opposing front and rear surfaces extending between first and second side surfaces, a top surface, and a bottom surface, and includes an opening within the body for the delivery window. The frame includes first and second frame side surfaces and frame top and bottom surfaces. The first and second frame side surfaces expand vertically in a telescoping fashion, with a first portion of the frame sliding into and out of a second portion of the frame as it contracts and expands, respectively, to match the adjacent door. In one possible embodiment, the frame may be telescopic and expandable both along the vertical and horizontal elements of the frame, allowing the frame to be custom-fit to the height of the door, and the required width to accommodate opening the house door and fitting a package through the window. In some embodiments, the delivery door extension includes a panel without a frame.

The delivery window within the panel is sized to receive normal package widths and dimensions. In one embodiment, the delivery window includes a window body that moves up and down within the opening of the panel. More specifically, the window body has a width and height that is larger than the width and height of the opening in the panel, and moves along tracks positioned on an inner surface of the first and second side surfaces of the panel between an open position and a closed position. In the open position, the window body is withdrawn into the panel body between the front and rear surfaces (e.g., like the operation of a pocket door). The window body moves along the tracks into the opening of the panel to close access through the opening when in the closed position. In other embodiments, other moving mechanisms may be provided to move the window body between the open and closed positions. For example, activation of the window may mechanically and automatically open the window in a hinged motion, vertically or horizontally. Movement of the window body may be controlled by a motor assembly housed inside a motor housing located on the panel. Further, the delivery window may be located at any suitable height within the dimensions of the panel.

In another possible embodiment, a shelf may be provided adjacent to the delivery window. In an inactive position, the shelf may be parallel to the panel and positioned adjacent to the window body when the window body is within the opening of the panel. The shelf attaches to the panel along a hinged connection and rotates about the hinged connect to extend outwardly from the panel into an active position.

In one embodiment, the shelf may automatically move into the active position to accommodate the landing of a drone delivery vehicle carrying a package. To accept drone deliveries, it is contemplated that the shelf and window would be placed close to the ground to allow adequate overhead clearance for the drone while it is carrying a package. The shelf may also include an automatic means such as a conveyor belt or other known mechanism to move the package through the delivery window and securely into the interior of the house. This embodiment would also include a system to guide the landing of the drone, such as a two-way communication device that provides location and spatial data to the drone in real-time, such as an electronic beacon, an RFID location chip, or any other suitable means to communicate the necessary data to the drone. In embodiments that feature mechanical and automatic window operation, and in embodiments that include a drone delivery shelf, the movement of the window and shelf are controlled by a motor assembly housed inside a motor housing located on the panel.

The delivery window can be unlocked and opened by a delivery driver, a remote drone operator, or the owner of the house through an activator panel on the panel body adjacent to the delivery window. The activator panel may utilize an alpha-numeric passcode, barcode scanner, RFID tag, or any other secure and discrete method, either directly or remotely. In one possible embodiment, the unlocking of the delivery window causes the window body to mechanically and automatically open upward or downward, and then close mechanically and automatically once the package has been inserted through the window.

In another possible embodiment, the shelf accommodates the landing of a drone delivery vehicle carrying a package. The shelf may include an automatic means to move the package through the delivery window and securely into the interior of the house. This embodiment of the delivery door extension may also include a system to guide the landing of the drone, such as a beacon or location chip which transmits location and spatial data to the drone, allowing it to land safely and deposit the package on the shelf.

The delivery door extension also includes one or more hinges on the first side surface of the frame, or the panel when a frame is not included, that attaches to corresponding hinges on the door jamb of the door so that the delivery door extension is movable about the hinges. A blocking mechanism is provided on the second side surface of the frame, or the panel when a frame is not included, extending forward from the front surface of the delivery door extension.

In some embodiments, the delivery door extension is fixed relative to the door jamb such that the blocking mechanism is positioned along the arc of the door swing such that when the door is opened, the door's movement is stopped by the blocking mechanism and the combination of the door and the delivery door extension do not expose the interior of the dwelling.

In one example embodiment, the delivery door extension includes a locking member comprising a resilient length of material (potentially adjustable), such as metallic rod, that is positioned so that a first end of the locking member is rests against the second frame side surface distal from the door jamb and a second end of the locking member is positioned against a wall, floor, or ceiling spaced apart from the door jamb and the first frame side surface. The second end of the locking member may fit into, or otherwise engage with, a corresponding reinforced receiving element to secure the second end of the locking member in place. For example, the locking member may be a metal bar whose second end fits into a reinforced metal receptacle located in the floor adjacent to the doorway. When the second end of the locking member is secured in the corresponding receptacle, the locking member blocks movement of the delivery door extension inwardly away from the door. To customize the installation, the length of the locking member may be adjusted to position of the delivery door extension so that the blocking mechanism is directly within the arc of the door swing.

In other embodiments, the locking member comprises a block of wood used as a stopper that prevents movement of the delivery door extension into the living space. Similarly, the wooden block may mate with an element (e.g., a corresponding reinforced receiving element) in the floor, wall, or ceiling adjacent to the doorway.

In a still further embodiment, rather than merely including a metal or wooden bar or block, the locking member includes a locking panel that is rotatably connected to the first frame side surface (i.e., closest to the door jamb). During installation, the locking panel rotates to sit against the wall adjacent to the door jamb. Once the locking panel is in contact with the wall, an adjustable length metallic rod extends from a position adjacent the intersection of the locking panel and the wall adjacent to the door jamb to the second frame side surface to position the blocking mechanism within the arc of the door swing.

Alternatively, the delivery door extension may be anchored to the floor or the ceiling so that the blocking mechanism is positioned along the arc of the door swing. In still further embodiments, the delivery door extension moves about the hinges during use and includes a track along the width of the frame or the panel that the door follows through a connector or another means of engagement.

In addition to these examples of adjustable locking mechanisms, it is understood that alternative locking mechanisms may also be used, as will be appreciated by those skilled in the art.

Prior to use, the delivery door extension is secured to the door jamb and extends into the room behind the door and the door is closed as normal within the jamb. As the door opens, an outer end surface of the door distal from its connection to the door jamb moves along the front surface of the panel from the first side surface to the second side surface. The blocking mechanism restricts movement of the door past the second side surface of the delivery door extension. Therefore the door can be opened only a specified amount to reveal the delivery door extension, and the delivery window and the activator panel, to the delivery person.

In some embodiments, the delivery door extension provides a method for use with existing electronic home security installations through the use of a door sensor mounted to the panel, which will signal the home security alarm if the delivery door extension is moved or removed from its mounts. The delivery door extension may also include a processor and/or camera for tracking use of the delivery door extension, including collecting, storing, and transmitting details regarding each use such as recorded video, recorded audio, time stamps of use, RFID or similar tracking of packages delivered, etc. Additionally, the present subject matter provides for a beacon or location identification chip, to guide the landing of drone delivery vehicles to provide a delivery through the delivery door.

Various data collection systems may be used in combination with the delivery door extension. For example, a camera may be used to record each activation and use of the delivery window. Similarly, an RFID reader or a barcode reader may be used to track the packages being delivered. One or more biometric scanners (e.g., finger print reader, retina scanner, face recognition system, etc.) may be used to collect data related to the users of the smart door. A processor, memory, and wireless communication module may be included to save and transmit video, audio, and other data to a central server or cloud computing network.

One concern with other attempted solutions (for example, Amazon's Amazon Key for Prime) is that a user must turn off the home alarm system in order for a third-party to deliver a package into the house. The present solutions address this problem by allowing limited access and integrating an alarm sensor of the delivery door extension with the house security system. Using the delivery door extension, a standard home alarm sensor can be mounted along the interface of the door frame and the delivery door extension. Thus, even when the alarm system is active, the alarm will not be triggered when access is provided through the window, but would be triggered if a third-party dislocated the frame and gained access to the house.

To unlock and fully open the house door with the delivery door extension installed, the homeowner can use a keyed lock or other mechanism to disengage the blocking mechanisms, allowing him to completely open the door and enter the house.

The frame of the delivery door extension is mounted in such a way that it is secured to or near to the frame or jamb of the house door. In one possible embodiment, the frame of the delivery door extension is hard-mounted to the frame of the house door, as well as to the floor and ceiling in the entryway to the house, in a permanent or semi-permanent manner.

In another possible embodiment, the delivery door extension is mounted to a hinge that is mounted to the frame of the house door, allowing the homeowner to move the delivery door extension away from the sweep arc of the house door when not in use. In yet another example, the delivery door extension is mounted in such a manner that it is completely removable, and only installed by the homeowner when it is needed. One example of a removable mount is a hinge pin mounted to the door jamb of the house, with a hinge ring mounted to the metal frame of the delivery door extension, allowing the user to remove the delivery door by lifting the ring element off of the hinge pin element.

In another embodiment, the delivery door extension includes a motorized hinge assembly which automatically swings the panel into position to accept a delivery, then swings the panel out of the arc path of the house door when the delivery is complete. In another embodiment, the delivery door extension includes a motorized pushrod or piston assembly that swings the hinged panel into and out of delivery position.

To access the window of the delivery door extension, an authorized person opens the door to the house, which is only allowed to open as far as the trailing edge of the frame of the delivery door extension, preventing entry to the house. Once the packages have been delivered through the window, the delivery person can securely close the house door.

Activation of the window of the delivery door extension can be accomplished through various means. In one possible embodiment, the window is activated by an alpha-numeric passcode entered into a keypad mounted on the panel. In another possible embodiment, the window is activated by a secure application on a smartphone, tablet, or other device, either by the delivery person via a Bluetooth or other wireless connection, or remotely by the homeowner through a WiFi or other wireless connection. In yet another possible embodiment, the window is activated by a barcode scanner mounted on the panel. In yet another possible embodiment, the window is activated by an RFID tag located on or inside the package being delivered, via a sensor mounted on the delivery door extension. However, it is contemplated that any combination of these examples may be used to open the window of the delivery door extension.

To further protect against theft or tampering, the delivery door extension includes a sensor that activates and alarm or an alert to the user, to notify them in real-time if someone reaches their hand and arm through the delivery window to steal or otherwise tamper with the delivered packages inside the house. This could be accomplished with a motion sensor, a magnetic switch, a laser interrupt sensor, a photovoltaic sensor, or any other type of sensor that detects the opening of the delivery window after the delivery has been made.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one implementation in accord with the present concept, by way of example only, not by way of limitations. In the figures, like reference numerals refer to the same or similar elements.

DETAILED DESCRIPTION OF THE DRAWINGS

FIGS. 1-9 illustrate example embodiments of a delivery door extension 2 to provide limited access into a house, apartment, place of business, or other unit. As seen best in FIGS. 5-7, the delivery door extension 2 attaches to an existing door jamb 4 on the inside of the unit and engages with an existing door 6 in the door jamb 4 in order to provide a delivery person with limited and controlled access into the unit by opening the door 6 a small amount to deliver a package 7 inside of the unit.

Figure 1:
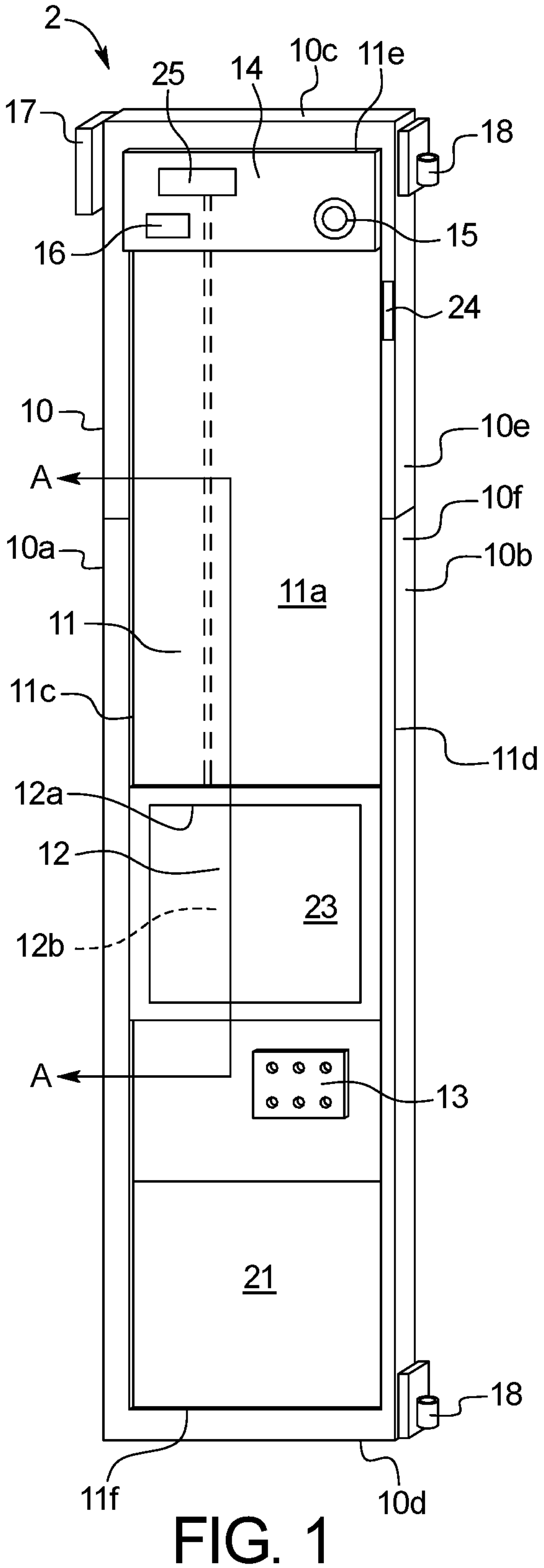
FIG. 1 is a front elevation view of the delivery door extension as described in the present application.

Referring to FIG. 1, the delivery door extension 2 includes a panel 11 mounted into a frame 10 that is roughly equal in height to the door 6. The metal frame 10 includes first and second frame side surfaces 10*a*, 10*b* and frame top and bottom surfaces 10*c*, 10*d*. The first and second side surfaces 10*a*, 10*b* expand vertically in a telescoping fashion, with a first portion 10*e* of the frame 10 sliding into and out of a second portion 10*f* of the frame 10 as it contracts and expands, respectively, to match the adjacent door 6. In another embodiment, the frame 10 may be telescopic and expandable both along the vertical and horizontal elements of the frame, allowing the frame 10 to be custom-fit to the height of the door 6, and the required width to accommodate opening the house door 6, and fitting a package 7 through the window 12. The side surfaces 10*a*, 10*b*, 10*c*, 10*d* of the frame 10 may be square tubular, round tubular, solid metal, any combination thereof, or any other suitable shape.

The panel 11 has a planar body with opposing front and rear surfaces 11*a*, 11*b* extending between first and second side surfaces 11*c*, 11*d*, a top surface 11*e*, and a bottom surface 11*f*. In some embodiments, the panel 11 may include a secondary panel 21 to extend the height of the panel 11 of the delivery door extension 2 to match the adjacent door 6. In one embodiment, the secondary panel 21 has a width slightly less than a width of the panel 11 and slides along an inner track on the first and second frame side surfaces 10*a*, 10*b* adjacent to the primary panel 11, and in other embodiments, the secondary panel 11 is received between the front and rear surfaces 11*a*, 11*b* within the panel 11, sliding up and down within the interior dimensions of the primary panel 11. In the illustrated embodiment, the panel 11 is securely held in place within the frame 10, while in other embodiments, the delivery door extension 2 may include the panel 11 without a frame 10.

Figure 5:
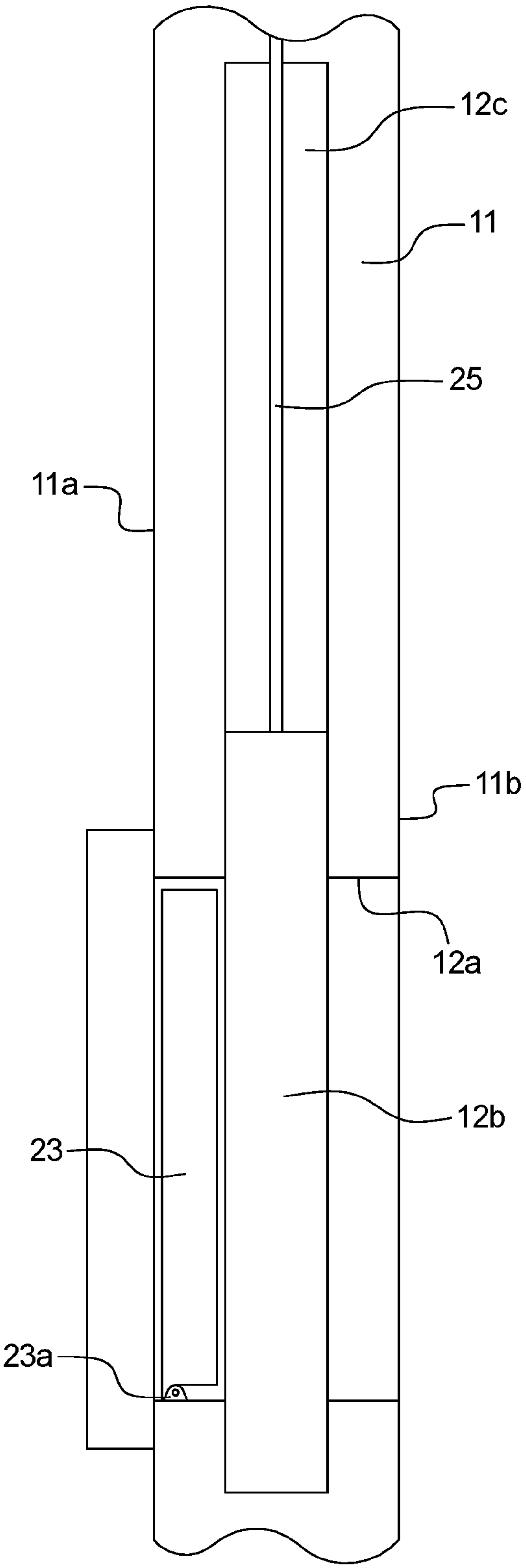
FIG. 5 is a cross-sectional view generally taken along lines A-A in FIG. 1 of the delivery door extension of FIG. 1.

The panel 11 also includes an opening 12*a* for the delivery window 12. The delivery window 12 within the panel 11 is sized to receive normal package widths and dimensions. The delivery window 12 includes a window body 12*b* that moves up and down within the opening 12*a* of the panel 11 between an open and closed position, respectively. The window body 12*b* has a width and height that are greater than the width and height of the opening 12*a*. In one embodiment, the window body 12*b* slides along tracks 12*c* on internal surfaces of first and second side surfaces 10*a*, 10*b* between the front and rear surfaces 11*a*, 11*b* of the panel 11 along the opening 12*a* as shown in FIG. 5, sliding up and down within the interior dimensions of the primary panel 11. In another embodiment, the tracks 12*c* are positioned along the internal surface of the first and second side surfaces 10*a*, 10*b* next to the rear surface 11*b* of the panel 11 along the opening 12*a* so the window body 12*b* moves parallel to the panel 11 along the rear surface 11*b* thereof.

Figure 4:
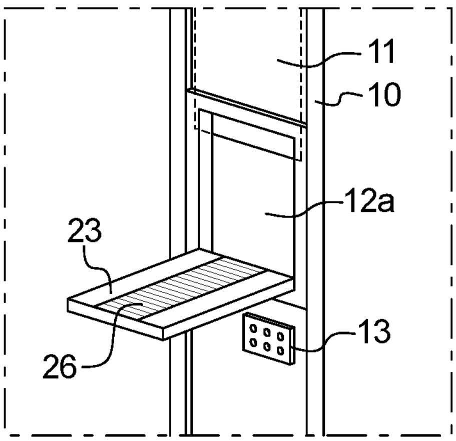
FIG. 4 is a perspective view of a delivery window and a delivery shelf of the delivery door extension of FIG. 1 in the open and extended positions, respectively.

In another possible embodiment, a shelf 23 may be provided adjacent to the delivery window 12 and moves between an active position and an inactive position. The shelf 23 is hingedly connected to the panel 11 at the opening 12*a* as seen in FIG. 5. In the inactive position, the shelf 23 is parallel to the window body 12*b* within the opening 12*a* of the panel 11. The shelf 23 rotates about a hinged connection 23*a* such that an upper end of the shelf 23 moves away from the opening 12*a* and extends outwardly from the panel 11 in the active position, as seen in FIG. 4. The shelf 23 may automatically move into the active position to accommodate the landing of a drone delivery vehicle carrying a package 7. The shelf 23 may also include an automatic means such as a conveyor belt or other known mechanism to move the package 7 along the shelf 23 and through the opening 12*a* into the interior of the house. This embodiment would also include a system to guide the landing of the drone, such as a beacon or location chip which transmits location and spatial data to the drone, allowing it to land safely and deposit the package.

In some embodiments, the delivery window body 12*b* is locked when in the closed position. The window body 12*b* can be unlocked and opened by a delivery driver or remote drone operator through an activator panel is provided on the panel 11 adjacent to the delivery window 12, and may include an alpha-numeric panel, an RFID sensor, a key fob sensor, a barcode scanner, or any other type of secure authentication device. In one embodiment, the unlocking of the delivery window 12 causes the window body 12*b* to mechanically and automatically open, and then close mechanically and automatically once the package 7 has been inserted through the opening 12*a*. The delivery door extension 2 also includes a motor assembly 25 housed inside a motor housing 14 located on or adjacent to the panel 11 to control movement of the delivery window body 12*b* and the shelf 23.

Figure 3:
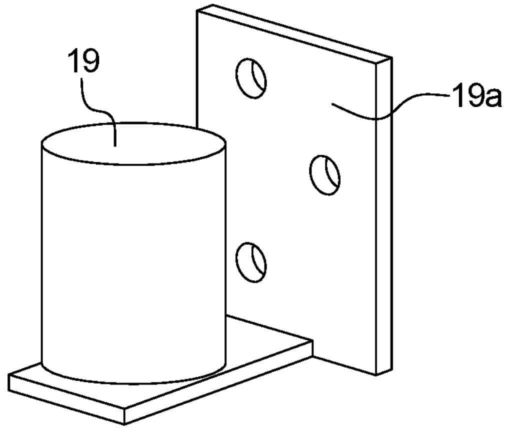
FIG. 3 is an enlarged, perspective view of the hinge of the delivery door extension of FIG. 1.

In the illustrated embodiment, one or more hinge rings 18 provided on the second frame side surface 10*b* attach to corresponding hinge pins 19 on the existing door jamb 4 so that the delivery door extension 2 is movable about the hinges 18, 19. Hinge rings 18 is mounted at the top and bottom of the metal frame 10, though it is contemplated that the hinge ring 18 could be mounted anywhere along the height of the metal frame 10. FIG. 3 shows one possible embodiment of a hinge pin 19 mounted to a bracket 19*a* that is secured to the door jamb 4 or other rigid vertical element in or near the door frame of the house. The hinge pin 19 accepts the hinge ring 18 to form a removable connection between the delivery door extension 2 and the door jamb 4. The hinge mechanism is merely one option contemplated to enable the delivery door extension to be easily installed and uninstalled for use in a temporary manner rather than a permanent or semi-permanent installation.

Figure 2:
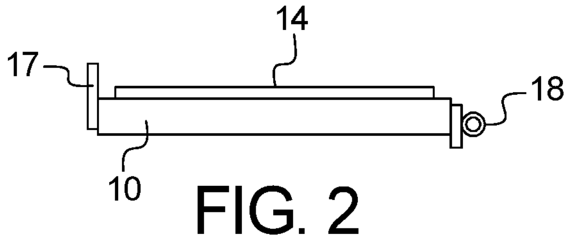
FIG. 2 is a plan view of the delivery door extension of FIG. 1.

On the opposite vertical frame element from the hinges 18, 19, a blocking mechanism 17 is provided on the second frame side surface and extends forward relative to the front surface 11*a* of the panel as shown in FIG. 2 to prevent the door 6 from opening beyond the width of the delivery door extension 2 where the frame 10 is mounted within the sweep arc of the door 6 as it swings. The blocking mechanism 17 is shown in one possible configuration, though it is contemplated that the blocking mechanism 17 could be located anywhere along the height of the metal frame 10. The blocking mechanism 17 lies inside the sweep arc of the door 6 in the door jamb 4. In alternative embodiments, the full height of the second frame side surface 10*b* protrudes from the front 11*a* of the panel 11, blocking the swing path of the house door.

Further, it is noted that the delivery door extension 2 described herein includes the hinge ring 18 and the blocking mechanism 17 on either of the first or second frame side surfaces 10*a*, 10*b*, so long as the hinge ring 18 and blocking mechanism 17 are attached to opposing side surfaces 10*a*, 10*b*. In some embodiments such as the embodiment shown in FIG. 1, the hinge ring 18 and the blocking mechanism 17 are attached to the second and first frame side surfaces 10*b*, 10*a*, respectively. In other embodiments such as the embodiment shown in FIGS. 6-8, the hinge ring 18 and the blocking mechanism 17 are attached to the first and second frame side surfaces 10*a*, 10*b*, respectively.

In some embodiments, the blocking mechanism 17 or other blocking component may be hingedly or otherwise movably connected to the frame 10 or panel 11, allowing the user to position the blocking mechanism 17 in an engaged configuration that limits the movement of the door to only open along the width of the delivery door extension 2 and reveal the delivery window, and an disengaged position where the blocking mechanism 17 is retracted, not extending beyond the front surface 11*a* of the panel 11, so the door 6 can open freely. In one embodiment, a key lock tumbler 20 may be provided on the frame 10 and includes components to move the blocking mechanism 17 between the engaged and disengaged positions.

In some embodiments, the delivery door extension 2 is fixed relative to the door jamb 4 at the hinges 18, 19 such that the blocking mechanism 17 is positioned along the arc of the door swing. In this embodiment, the blocking mechanism 17 is fixed on the panel 11 and/or the frame 10, and the key lock tumbler 20 includes components to lock and unlock the hinges 18, 19. Alternatively, the delivery door extension 2 may be anchored to the floor or the ceiling so that the blocking mechanism 17 is positioned along the arc of the door swing. In other embodiments, the delivery door extension 2 moves about the hinges 18, 19 during use and includes a track along the width of the frame or the panel that an outermost edge of the door follows through a connector or another means of engagement.

Figure 7:
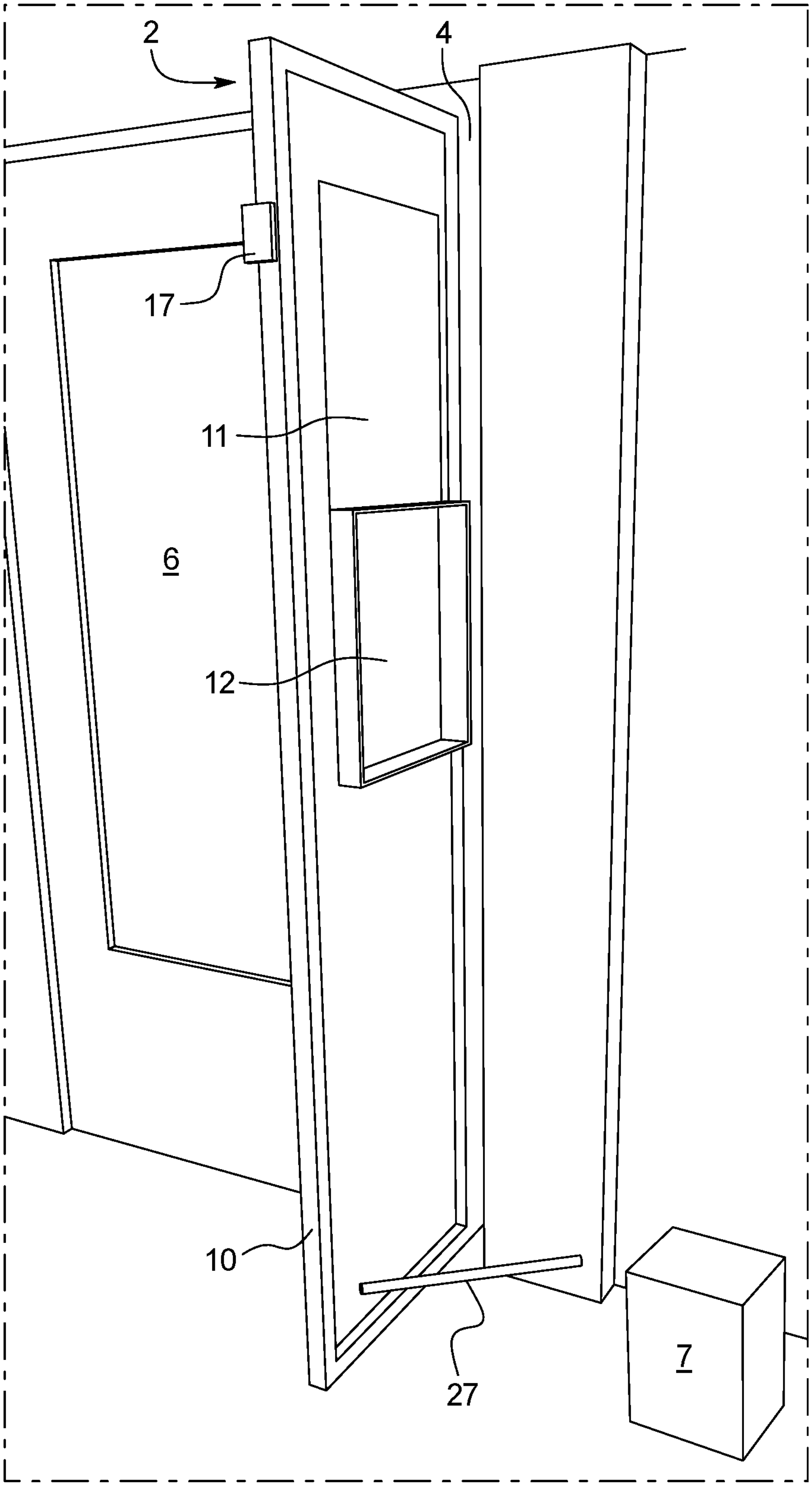

In one example embodiment as shown in FIG. 7, the delivery door extension 2 includes a locking member 27 comprising a resilient length of material (potentially adjustable), such as metallic rod, that is positioned so that a first end of the locking member 71 is rests against the panel 11 or the second frame side surface 10*b* distal from the door jamb 4 and a second end of the locking member 17 is positioned against a wall, floor, or ceiling spaced apart from the door jamb 4 and the first frame side surface 10*a*. The second end of the locking member 27 may fit into, or otherwise engage with, a corresponding reinforced receiving element to secure the second end of the locking member 27 in place. For example, the locking member 27 may be a metal bar whose second end fits into a reinforced metal receptacle located in the floor adjacent to the doorway. When the second end of the locking member 27 is secured in the corresponding receptacle, the locking member 27 blocks movement of the delivery door extension 2 inwardly away from the door 6. To customize the installation, the length of the locking member 27 may be adjusted to position of the delivery door extension 2 so that the blocking mechanism 17 is directly within the arc of the door swing.

In other embodiments, the locking member 27 comprises a block of wood used as a stopper that prevents movement of the delivery door extension into the living space. Similarly, the wooden block may mate with an element (e.g., a corresponding reinforced receiving element) in the floor, wall, or ceiling adjacent to the doorway.

In a still further embodiment, rather than merely including a metal or wooden bar or block, the locking member 27 includes a locking panel that is rotatably connected to the first frame side surface 10*a* (i.e., closest to the door jamb 4). During installation, the locking panel rotates to sit against the wall adjacent to the door jamb 4. Once the locking panel is in contact with the wall, an adjustable length metallic rod extends from a position adjacent the intersection of the locking panel and the wall adjacent to the door jamb 4 to the second frame side surface 10*b* to position the blocking mechanism 17 within the arc of the door swing.

A security sensor 24 may also be provided on the front surface of the panel or the frame 10, adjacent to the door jamb and integrated into the user's home security system by corresponding with the placement of a security sensor on the door jamb. It is contemplated that these sensors could be magnetic-type sensors, or any other appropriate type of security sensor.

A camera 15 may also be provided within the motor housing 14, the frame 10, or the front surface of the panel body 11. A processor unit 16 is included within the motor housing 14, though it is contemplated that the processor unit could be mounted anywhere on the metal frame 10 or panel 11, including inside of the motor housing 14.

Figure 6:
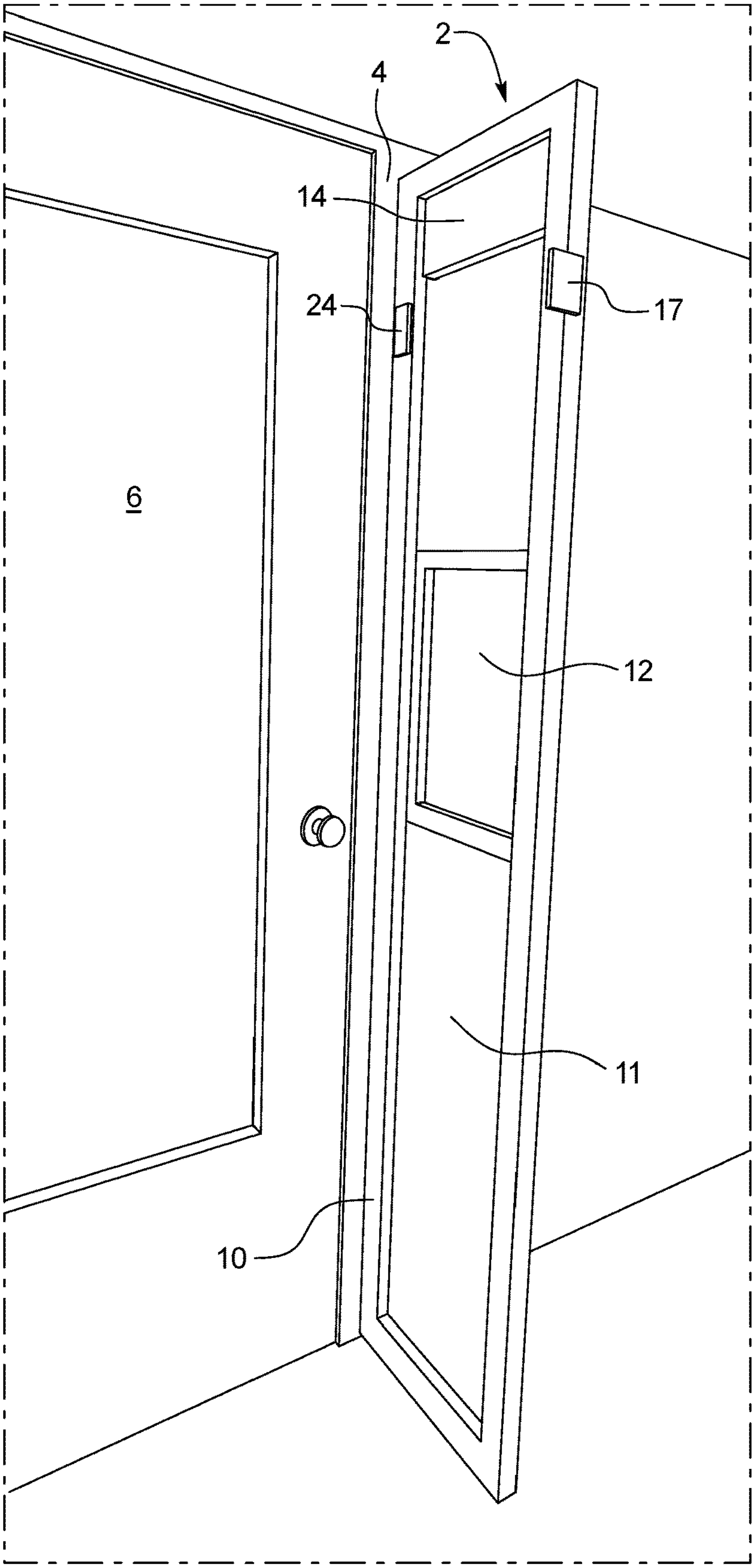
FIGS. 6 and 7 are front and rear perspective views of a further embodiment of the delivery door extension attached to an existing door jamb when the door is closed.
Figure 8:
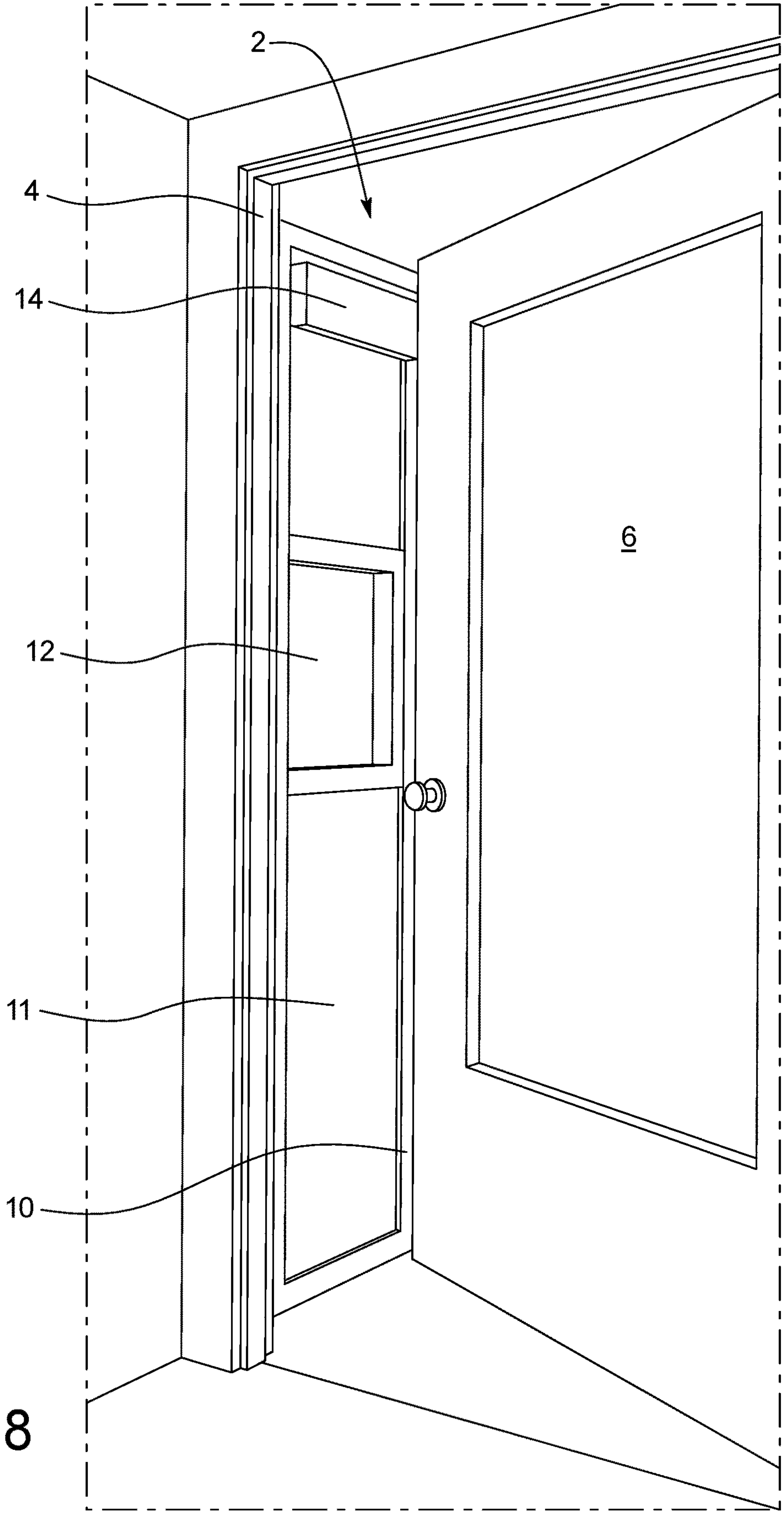
FIG. 8 is a front perspective view of the delivery door extension of FIGS. 6 and 7 attached to the existing door jamb when the door is open.

FIGS. 6-8 illustrate the delivery door extension 2 as used within an existing door jamb 4. As shown in FIGS. 6 and 7, the door 6 is closed within the jamb 4 and the delivery door extension 2 is secured to the door jamb 4 and extends into the room of the house. As the door 6 opens as shown in FIG. 8, a side surface of the door 6 moves along the front surface 11*a* of the panel 11 from the first frame side surface 10*a* to the second frame side surface 10*b* of the delivery door extension 2. The blocking mechanism 17 restricts movement of the door 6 past the second frame side surface 10*b* of the delivery door extension 2. Therefore the door 6 opens only a specified amount to reveal the delivery door extension 2 to the delivery person.

Figure 9:
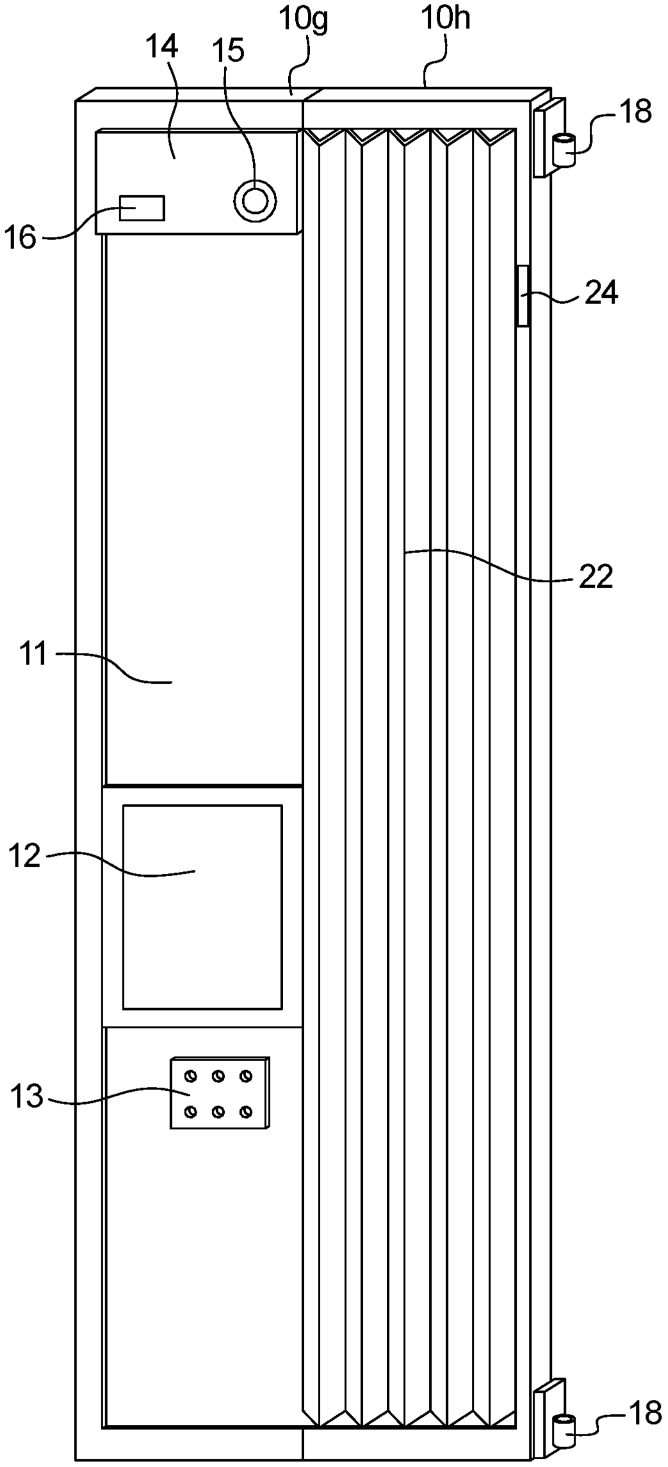
FIG. 9 is a front view of a further embodiment of a delivery door extension with a horizontal accordion panel element.

In a further embodiment shown in FIG. 9, the delivery door extension includes a horizontal accordion panel 22 that expands to increase the width of the delivery door extension 2. The metal frame 10 expands laterally in a telescoping fashion, with a first lateral portion 10*g* of the frame sliding into the a second lateral portion 10*h* of the frame 10 as it contracts and sliding out as the frame 10 expands. Accordingly, the width of the frame 10 may accommodate various installations. The accordion panel 22 may be made of plastic or other suitable material.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A delivery door extension that attaches to an existing door jamb and engages with an existing door, the delivery door extension comprising:

- a panel having a planar body with opposing front and rear surfaces extending between first and second side surfaces, a top surface, and a bottom surface, wherein the panel body includes an opening;
- an accordion panel configured to expand in width;
- a delivery window body configured to move between an open position and a closed position along the opening of the panel;
- a hinge attachment mechanism attached to the first side surface of the panel or the accordion panel, wherein the hinge attachment mechanism is rotatably connected to the door jamb; and
- a blocking mechanism on the second side surface that restricts movement of the existing door.

2. The delivery door extension of claim 1, wherein the blocking mechanism is attached to the second side surface of the panel.

3. The delivery door extension of claim 1, further comprising an activator panel that controls operation of the delivery window.

4. The delivery door extension of claim 3, wherein the activator panel includes one of an alpha-numeric panel, an RFID sensor, a key fob sensor, a barcode scanner.

5. A delivery door extension that attaches to an existing door jamb and engages with an existing door, the delivery door extension comprising:

a panel having a planar body with opposing front and rear surfaces extending between first and second side surfaces, a top surface, and a bottom surface, wherein the panel body includes an opening;

a delivery window body configured to move between an open position and a closed position along the opening of the panel;

a hinge attachment mechanism attached to the first side surface of the panel, wherein the hinge attachment mechanism is rotatably connected to the door jamb;

a blocking mechanism on the second side surface that restricts movement of the existing door; and a key lock in connection with the blocking mechanism.

6. A delivery door extension that attaches to an existing door jamb and engages with an existing door, the delivery door extension comprising:

a panel having a planar body with opposing front and rear surfaces extending between first and second side surfaces, a top surface, and a bottom surface, wherein the panel body includes an opening;

a delivery window body configured to move between an open position and a closed position along the opening of the panel;

a hinge attachment mechanism attached to the first side surface of the panel, wherein the hinge attachment mechanism is rotatably connected to the door jamb;

a blocking mechanism on the second side surface that restricts movement of the existing door; and a shelf that attaches to the panel adjacent to the opening, wherein the shelf is configured to move between an active position and an inactive position.

7. The delivery door extension of claim 6, wherein the shelf extends outwardly from the panel in the active position.

8. A delivery door extension that attaches to an existing door jamb and engages with an existing door, the delivery door extension comprising:

a panel having a planar body with opposing front and rear surfaces extending between first and second side surfaces, a top surface, and a bottom surface, wherein the panel body includes an opening;

a delivery window body configured to move between an open position and a closed position along the opening of the panel;

a hinge attachment mechanism attached to the first side surface of the panel, wherein the hinge attachment mechanism is rotatably connected to the door jamb;

a blocking mechanism on the second side surface that restricts movement of the existing door; and a shelf hingedly connected to the panel body adjacent to the opening, wherein the shelf moves between an extended position and a withdrawn position.

9. The delivery door extension of claim 8, wherein, in the extended position, the shelf extends away from the panel body, and wherein, in the withdrawn position, the shelf is positioned parallel to the panel body.

* * * * *